(12) United States Patent
Milton

(10) Patent No.: US 6,748,071 B2
(45) Date of Patent: Jun. 8, 2004

(54) METHOD AND APPARATUS FOR TREATING EXTERNALLY-ORIGINATED CALLS AS COMING FROM INTERNAL SWITCH EXTENSIONS

(75) Inventor: Stephen M. Milton, Freehold, NJ (US)

(73) Assignee: Avaya Technology Corp., Basking Ridge, NJ (US)

( * ) Notice: Subject to any disclaimer, the term of this patent is extended or adjusted under 35 U.S.C. 154(b) by 381 days.

(21) Appl. No.: 09/908,155

(22) Filed: Jul. 18, 2001

(65) Prior Publication Data

US 2003/0016811 A1 Jan. 23, 2003

(51) Int. Cl.$^7$ .......................... H04M 3/00; H04M 3/42; H04M 7/00
(52) U.S. Cl. ............. 379/246; 379/201.12; 379/221.14; 379/233
(58) Field of Search .................. 379/201.01, 201.02, 379/201.12, 207.11, 219, 220.01, 221.14, 230, 231, 232, 233, 242, 245, 246, 901; 455/414.1

(56) References Cited

U.S. PATENT DOCUMENTS

| | | | | |
|---|---|---|---|---|
| 5,247,571 A | * | 9/1993 | Kay et al. | 379/221.09 |
| 5,339,356 A | * | 8/1994 | Ishii | 379/234 |
| 5,404,395 A | * | 4/1995 | Bogart et al. | 379/201.03 |
| 5,452,347 A | * | 9/1995 | Iglehart et al. | 379/199 |
| 6,038,302 A | | 3/2000 | Burok et al. | 379/201.01 |
| 6,169,797 B1 | * | 1/2001 | Wildgrube et al. | 379/233 |
| 6,516,061 B2 | * | 2/2003 | Horowitz et al. | 379/233 |

* cited by examiner

Primary Examiner—Harry S. Hong
(74) Attorney, Agent, or Firm—Ryan, Mason & Lewis, LLP

(57) ABSTRACT

An incoming call received in a private branch exchange (PBX) or other communication system switch at an external port of the switch is processed by the switch so as to appear to a destination terminal as if it were originated by an internal extension associated with the switch. The incoming call may be from a mobile telephone or other originator terminal that is utilizable external to a premises serviced by the switch and does not have an extension associated with any internal endpoint serviced by the switch. The switch attempts to map an identifier associated with the incoming call to a corresponding entry in a stored list of external endpoints registered with the switch. If the identifier has a corresponding entry on the list, the switch processes the incoming call such that it appears to the destination terminal as being originated by an assigned internal extension. For example, an internal alerting indicator and associated station display may be provided at the destination terminal. A user at an originator terminal may also be permitted to access one or more features of the switch after an identifier associated with an incoming call from the originator terminal to a designated remote access extension has been mapped to a corresponding entry in the stored list of external endpoints.

21 Claims, 3 Drawing Sheets

METHOD AND APPARATUS FOR TREATING EXTERNALLY-ORIGINATED CALLS AS COMING FROM INTERNAL SWITCH EXTENSIONS

RELATED APPLICATION

The present invention is related to an invention described in U.S. patent application Ser. No. 09/908,156, filed herewith in the name of inventor Stephen M. Milton and entitled "Method and Apparatus for Extending Calls to Internal Switch Extensions Out to External Network Endpoints," which is incorporated by reference herein.

FIELD OF THE INVENTION

The invention relates generally to call processing in communication systems, and more particularly to systems in which calls or other communications are directed by a switch to or from wired or wireless telephones or other types of user terminals.

BACKGROUND OF THE INVENTION

Conventional communication system switches, such as private branch exchanges (PBXs) and other premises-based telephone switches, generally support a wide variety of useful features, such as bridged call appearances, hunt groups, call forwarding, navigable directories, multi-call conferencing, etc. However, these and other switch-based features are typically provided only to those user terminals that represent internal extensions within the premises serviced by the switch. As a result, a user terminal associated with an external network is generally unable to avail itself of the full set of features supported by the switch.

By way of example, an incoming call originating from a mobile telephone or other mobile device and directed to an internal extension serviced by the switch typically appears to the called party terminal simply as an externally-originated call. The caller and called party therefore typically do not have available to them the full range of switch services for use in processing the call. Conventional switches are unable to extend the switch-based features to such a call in an efficient and cost-effective manner.

It is known in the art to process call initiation requests generated by computer-telephony integration (CTI) applications external to a PBX or other communication system switch. Such techniques are described in U.S. Pat. No. 6,038,302 issued Mar. 14, 2000 in the name of inventors Didina Burok, Brian Hillis and Steven Michael Silverstein and entitled "Methods and Apparatus for Processing Phantom Calls Placed Via Computer-Telephony Integration (CTI)," which is incorporated by reference herein. In these techniques, the originator is a "phantom" extension that does not correspond to a physical communication device of the system. However, these and other known techniques do not adequately address the above-noted problems associated with calls originating from mobile telephones or other external user terminals and directed to particular internal extensions serviced by the switch.

A need therefore exists for call processing techniques that allow external user terminals to access premises-based communication switch features in a manner similar to an internal extension serviced by the switch.

SUMMARY OF THE INVENTION

The present invention provides methods and apparatus for processing an incoming call received in a switch from an external network, in a manner that allows the corresponding originator terminal or other external endpoint to be treated as if it were an internal extension serviced by the switch.

In accordance with one aspect of the invention, an incoming call received in a private branch exchange (PBX) or other communication system switch from a mobile telephone or other originator terminal of the system is processed to determine an associated identifier. The originator terminal is utilizable external to a premises serviced by the switch, and does not have an extension associated with any internal endpoint serviced by the switch. The switch attempts to map the identifier associated with the incoming call to a corresponding entry in a stored list of external endpoints registered with the switch. If the identifier has a corresponding entry on the list, the switch processes the incoming call such that it appears to a destination terminal as being originated by an internal extension. For example, the incoming call may be processed as if it originated from a particular internal extension assigned to the corresponding originator terminal. More particularly, an internal alerting indicator and associated station display identifying an extension assigned to the originator terminal may be provided at the destination terminal.

In accordance with another aspect of the invention, a user at an originator terminal may be permitted to access one or more features of the switch after an identifier of an incoming call from that originator terminal to a remote access extension has been associated with a corresponding entry in the stored list of external endpoints. More particularly, after the incoming call to the remote access extension is connected, and the identifier of the incoming call is associated with an entry in the stored list, the user may access the one or more features of the switch by entering a designated security code followed by appropriate feature access codes.

Advantageously, the invention allows a mobile telephone or other external endpoint to be treated as if it were an actual internal extension serviced by the switch. This in turn allows a given external endpoint to access at least a subset of the desirable call processing features provided by the switch, and thereby overcomes one or more of the above-described problems associated with conventional techniques.

DETAILED DESCRIPTION OF THE INVENTION

The invention will be illustrated below in conjunction with an exemplary communication system. Although well suited for use with, e.g., a system having a private branch exchange (PBX) or other similar call processing switch, the invention is not limited to use with any particular type of communication system switch or configuration of system elements. Those skilled in the art will recognize that the disclosed techniques may be used in any communication application in which it is desirable to provide improved control of calls directed from an external network into a PBX or other communication system switch. The term "call" as used herein is intended to include not only telephone calls but also non-telephonic communications such as data transmissions, voice-over-IP, facsimile, etc.

Figure 1:
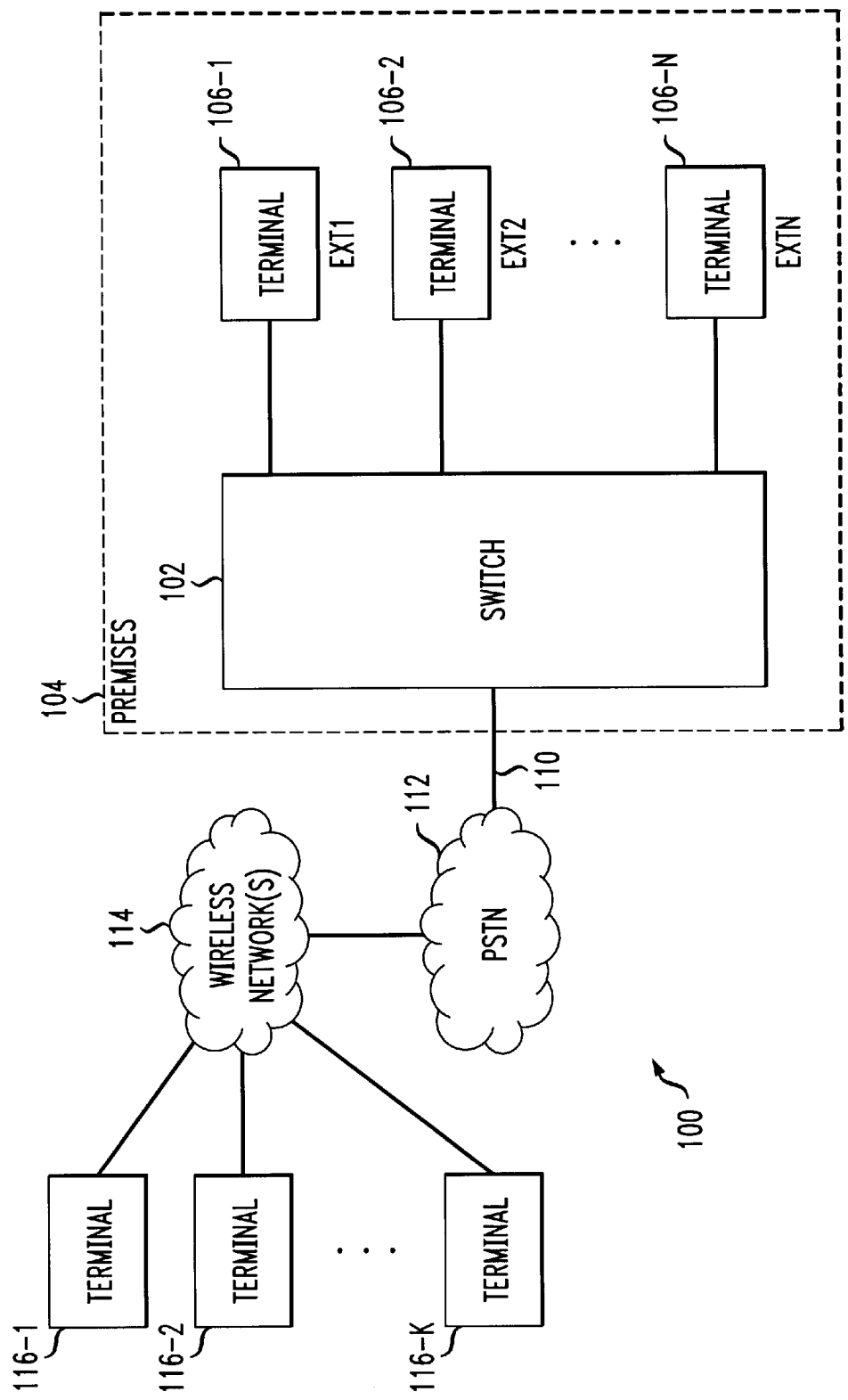
FIG. 1 shows an exemplary communication system in which the invention is implemented.

FIG. 1 shows an exemplary communication system 100 in which the invention is implemented. The system 100 includes a switch 102 which serves a premises 104 having a number of terminals 106-1, 106-2, . . . 106-N. Each of the terminals 106-1, 106-2, . . . 106-N corresponds to one of a set of internal extensions Ext1, Ext2, . . . ExtN as shown. These extensions are referred to herein as "internal" in that they are extensions within the premises 104 that are directly serviced by the switch. More particularly, these extensions correspond to conventional terminal endpoints serviced by the switch, and the switch can direct incoming calls to and receive outgoing calls from these extensions in a conventional manner.

The term "switch" as used herein should be understood to include a PBX, an enterprise switch, or other type of telecommunications system switch, as well as other types of processor-based communication control devices such as servers, computers, adjuncts, etc.

By way of example, the switch 102 in the illustrative embodiment may be implemented as an otherwise conventional DEFINITY® Enterprise Communication Service (ECS) communication system switch available from Avaya Inc. of Basking Ridge, N.J., USA. Other types of known switches may be used. The conventional aspects of such switches are well known in the art and therefore not described in detail herein.

The terminals 106 may be wired desktop telephone terminals or any other type of terminals capable of communicating with the switch 102. The word "terminal" as used herein should therefore be understood to include not only wired or wireless desktop telephone terminals, but also other types of processor-based communication devices, including but not limited to mobile telephones, personal computers, personal digital assistants (PDAs), etc.

The switch 102 is also coupled via one or more trunk lines 110 to a public switched telephone network (PSTN) 112. The trunk lines 110 carry incoming calls from the PSTN 112 to the switch 102 for processing, and carry outgoing calls from the switch 102 to the PSTN 112. The PSTN 112 is coupled to one or more wireless networks 114, which have associated therewith terminals 116-1, 116-2, . . . 116-K.

It should be noted that the invention does not require any particular type of information transport medium between switch 102 and terminals 116, i.e., the invention may be implemented with any desired type of transport medium as well as combinations of different types of transport media. The one or more wireless networks 114 may be wireless cellular systems of a type well known in the art.

Each of the terminals 116-1, 116-2, . . . 116-K represents an external terminal not corresponding to any internal extension of the switch 102. These terminals are referred to as "external" in that they are not directly supported as terminal endpoints by the switch 102. Like the terminals 106, the terminals 116 may be wired or wireless desksets, mobile telephones, personal computers, PDAs, etc. The terminals 116 are an example of devices more generally referred to herein as "external endpoints."

Although shown as being connected to the wireless network(s) 114 in FIG. 1, one or more of the external terminals 116 could instead be connected directly to the PSTN 112. More generally, the present invention can be implemented using any desired type of external endpoint and network connection.

As will be described in greater detail below, the present invention in accordance with one aspect thereof configures the switch 102 such that one or more of the external terminals 116 are treated substantially as internal switch extensions. Advantageously, this allows a given external terminal to access at least a subset of the desirable call processing features provided by the switch 102.

It should be emphasized that the configuration of the switch, user terminals and other elements as shown in FIG. 1 is for purposes of illustration only, and should not be construed as limiting the invention to any particular arrangement of elements.

Figure 2:
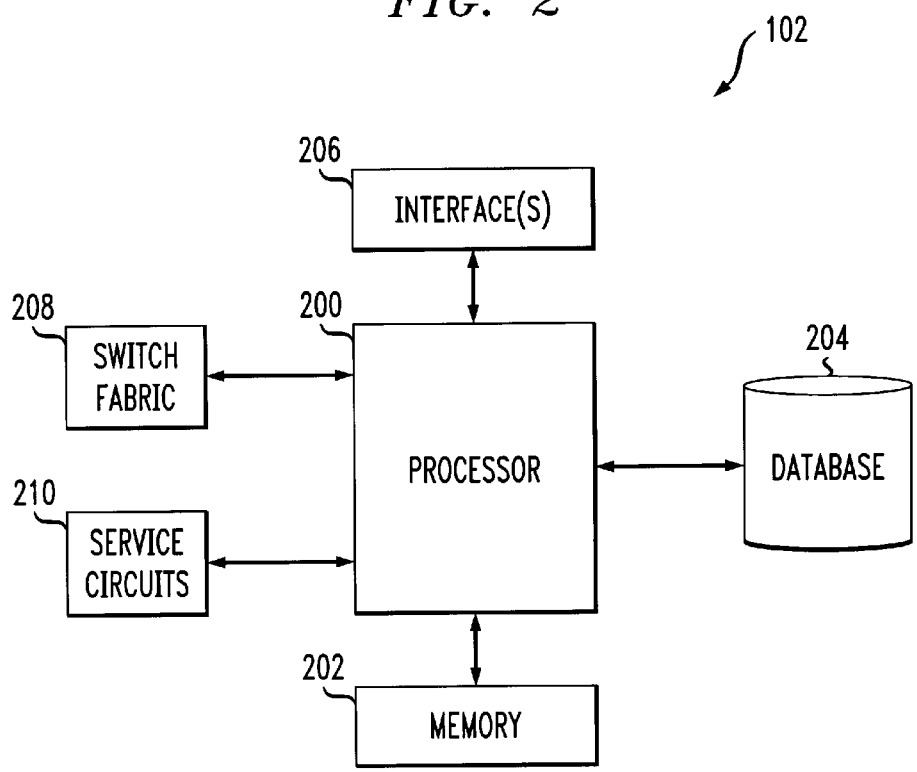
FIG. 2 is a block diagram showing one possible implementation of a switch of the FIG. 2 system.

FIG. 2 shows a more detailed view of one possible implementation of the switch 102 in the system of FIG. 1. The switch 102 in this implementation includes a processor 200, a memory 202, a database 204, one or more interfaces 206, a switch fabric 208, and a set of service circuits 210. The processor 200 may be implemented as a central processing unit (CPU), microprocessor, application-specific integrated circuit (ASIC) or other type of digital data processor, as well as various portions or combinations of such elements. The memory 202 may be a random access memory (RAM), a read-only memory (ROM) or combinations of these and other types of electronic memory devices.

The processor 200 operating in conjunction with the memory 202 executes one or more software programs for providing feature processing and other functions within the switch 102. The manner in which such functions are made accessible to one or more of the external terminals 116 will be described in greater detail below in conjunction with the flow diagram of FIG. 3. Such programs may be stored in memory 202 or another storage device accessible to the switch 102 and executed by processor 200 in a conventional manner.

The database 204 may be, e.g., an optical or magnetic disk-based storage device, or other conventional storage device associated with or otherwise accessible to the switch 102. The database 204 may be used to store, e.g., feature assignments to particular feature buttons or codes, directory number assignments to corresponding call appearances or direct facility termination keys, access restrictions, and other known administrative information regarding the configuration of the system 100, as well as other types of information.

The service circuits 210 may include tone generators, announcement circuits, etc. These circuits and the interfaces 206 are controlled by processor 200 in implementing call processing functions in the switch 102.

The switch 102 may include additional elements which are omitted from FIG. 2 for simplicity and clarity of illustration. For example, the switch may include a port card for each type of user terminal associated therewith. In addition, it will be appreciated by those skilled in the art that the switch 102 may be configured to support multiple user terminals of different types, e.g., wired deskset terminals, wireless deskset terminals, personal computers, video telephones or other advanced terminals, etc.

Also associated with the switch 102 may be an administrator terminal (not shown) which is used to program the operation of the switch 102 during a system administration, e.g., an initial set-up and configuration of the system or a subsequent system-level or user-level reconfiguration.

Other devices not shown in the figures may be associated with the switch 102, such as an adjunct feature server. Such an adjunct may be physically incorporated within the switch, and may be partially or completely implemented using other switch elements such as processor 200 and memory 202.

Figure 3:
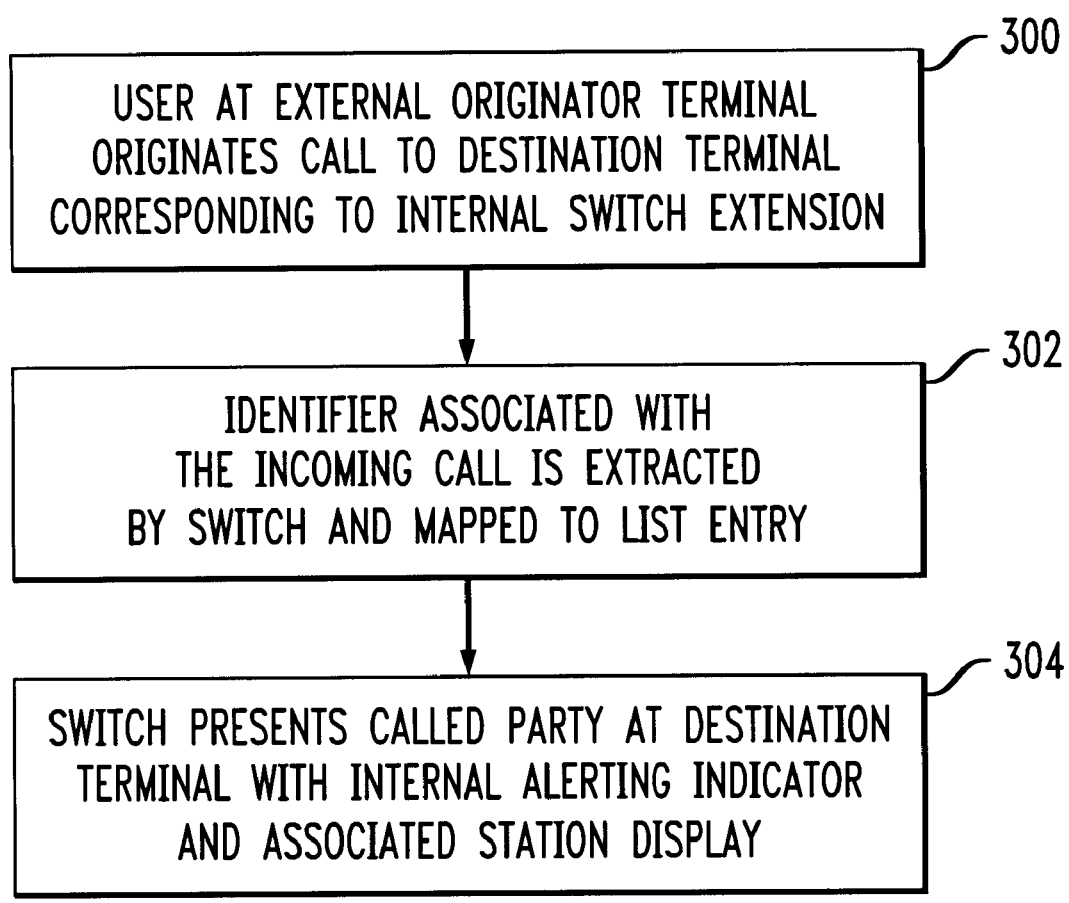
FIG. 3 is a flow diagram illustrating the processing of an incoming call by the switch in the system of FIG. 1 in accordance with the techniques of the invention.

FIG. 3 is a flow diagram illustrating the manner in which an incoming call originating at one of the external terminals 116 may be treated as being originated by an internal switch extension, in accordance with the techniques of the invention.

In step 300, a user at an external originator terminal corresponding to one of the terminals 116 of FIG. 1 originates a call to a destination terminal within premises 104 and corresponding to a particular one of the internal switch extensions Ext1, Ext2, . . . ExtN. The incoming call from the originator terminal is received by the switch 102 at an external port thereof in a conventional manner. An "external port" of a switch is a port at which calls from external terminals or other external endpoints are received.

In step 302, an identifier associated with the incoming call is extracted by or otherwise made apparent to the switch 102. The identifier may be, e.g., the calling number of the incoming call, and may be made apparent to the switch through well-known conventional techniques such as automatic number identification (ANI). Other types of identifiers can also be used. For example, particular identifiers may be assigned to known external terminals or other external endpoints associated with users of the internal extension terminals 106, e.g., by a system administrator or otherwise, and stored in a tabular form in the memory 202 or database 204 using conventional techniques. The term "stored list" as used herein should be understood to include any set of information stored in a memory or other storage device accessible to the switch. The invention does not require that the information be stored in any particular format, e.g., a tabular format, and numerous suitable storage formats will be readily apparent to those skilled in the art.

The process of storing identifiers in the switch for external terminals such that calls from those terminals are treated as having originated from internal extensions is referred to herein as registration. This registration can be implemented by the above-noted system administrator, or through another suitable manual or automated technique. As a result of this registration process, an identifier associated with the incoming call may be mapped to a corresponding entry in a stored list of external terminals registered with the switch. The entry may include, e.g., the identifier associated with the incoming call, an internal extension not corresponding to any internal terminal directly serviced by the switch, as well as other information.

Once the identifier has been extracted or otherwise made apparent to the switch 102, an attempt is made to map the identifier to a particular entry on the above-noted stored list via table look-up or other suitable technique. If the extracted identifier has a corresponding entry on the stored list, the switch processes the call as if it originated at an internal extension of the switch, as described below. Otherwise, the call is processed as any other externally-originated call.

The term "map" as used herein is intended to be construed broadly to include any technique for determining if a given identifier has a corresponding entry on a stored list.

In step 304, assuming that the identifier of the originator terminal has a corresponding entry on the stored list, the switch presents the called party at the destination terminal with an internal alerting indicator and an associated station display. The presentation of the call at the destination terminal is thus substantially the same as if the call originated from an internal extension serviced by the switch. The alerting indicator and associated station display as presented at the destination terminal may be configured in a well-known conventional manner, and will therefore not be described in further detail herein.

It should be noted that it is possible to associate with each of the stored external terminal identifiers a corresponding actual internal extension, such as extensions designated as N+1, N+2, etc. As noted above, such extensions may be assigned to external terminals and entered in the stored list as part of a registration process. Calls from a given external terminal are then processed as if they originated from the corresponding internal extension assigned thereto. However, the switch can provide the above-described processing without assignment of an actual internal extension to a given external terminal.

In accordance with another aspect of the invention, the switch 102 may be configured to permit the user at the external originator terminal to direct a call to a designated remote access extension in order to access switch features. Such features may include, e.g., bridged call appearances, hunt groups, call forwarding, navigable directories, multi-call conferencing or any other features supported by the switch. The originator terminal must first be registered in the manner described previously. The remote access extension is preferably implemented as a number on the switch that may be directly dialed from the originator terminal. When a call to this extension is received in the switch, the switch attempts to map the corresponding identifier to an entry on the stored list of external terminals registered with the switch. If the identifier has an entry in the list, the call is connected. The switch may also require that the user at the external originator terminal enter one or more security codes after dialing the designated remote access extension before permitting access to the switch features. Once access is granted, particular switch features may be activated by entry of feature access codes by the user in a conventional manner.

The above-described remote access may be implemented through use of one or more abbreviated dialing entries on an abbreviated dialing list, e.g., a system list. In such an arrangement, abbreviated dialing entries may be created for a desired set of feature access codes, e.g., automatic call distribution (ACD) related features. For convenience, all of the entries should be in the same group list or in the system list. An abbreviated dialing entry is generated for each registered external endpoint that needs to reference the list. A number is selected for each feature access code from a pool of available direct inward dialing (DID) numbers. Incoming call handling treatment, assuming an integrated services digital network (ISDN) trunk, transforms each dialed DID number into a new digit string. Each of these digit strings contains an abbreviated dialing list feature access code plus the dial code for a particular feature access code. By way of example, the new digit string may be given by *7001, which contains a feature access code *70 for a designated abbreviated dialing list plus a dial code 01 for remote access extension entry.

In operation, when a registered external endpoint calls the specified DID number, that number is mapped to a corresponding stored entry, the number is transformed into the new digit string that invokes the abbreviated dialing entry, and finally the remote access extension is called and dial tone returned. Once the remote access security has been satisfied, the caller may call any destination or invoke any feature permitted by the class of restriction. In contrast, if an arbitrary caller dials the DID number, that caller will receive intercept treatment. This is because the abbreviated dialing feature is only accessible from terminals serviced by the switch. Advantageously, the above-described abbreviated dialing approach may be used to provide access to a select group of switch features in a secure manner. Without the mapping to a registered external endpoint entry, the call remains a regular trunk call, and there is no dial tone to attract hackers.

As previously noted, the call processing functions described above in conjunction with the illustrative embodiment of the invention may be implemented in whole or in part in the switch 102, e.g., in call processing software thereof utilizing processor 200 and memory 202. Other suitable combinations of hardware and/or software may be used to implement the call processing functions of the invention.

It should again be emphasized the above-described embodiment is illustrative only. Alternative embodiments may utilize different switch and terminal configurations, different types of internal and external endpoints, and different techniques for processing calls originating from terminals or other external endpoints not directly serviced by the switch. These and numerous other alternative embodiments within the scope of the following claims will be apparent to those skilled in the art.

What is claimed is:

1. A method of processing an incoming call received at an external port of a communication system switch in a communication system, the method comprising the steps of:
   determining if an identifier associated with the incoming call has a corresponding entry in a stored list of external endpoints registered with the switch, the incoming call being a call initiated by entering at an originator terminal of the system a called number associated with a particular destination terminal supported by the switch, the identifier being extracted by the switch directly from the incoming call without requiring any further interaction between the switch and the originator terminal of the incoming call; and
   processing the incoming call such that the incoming call appears to the destination terminal as being originated by an internal extension associated with the switch if the identifier associated with the incoming call has a corresponding entry in the stored list of external endpoints registered with the switch;
   wherein the switch is configured such that upon determining that the identifier associated with the incoming call has a corresponding entry in the stored list of external endpoints, the incoming call is automatically processed such that the incoming call appears to the destination terminal as being originated by an internal extension associated with the switch, without requiring any further exchange of call setup information between the originator terminal and the switch.

2. The method of claim 1 wherein the incoming call is received at the external port of the switch from an originator terminal utilizable external to a premises serviced by the switch and not having an extension associated with any internal endpoint serviced by the switch.

3. The method of claim 1 wherein the determining step comprises mapping the identifier associated with the incoming call to the corresponding entry in the stored list of external endpoints registered with the switch.

4. The method of claim 1 wherein the corresponding entry comprises the identifier associated with the incoming call and an internal extension assigned to an originator terminal and not associated with any internal endpoint serviced by the switch.

5. The method of claim 1 wherein the incoming call is originated by an originator terminal comprising a wireless terminal coupled to a wireless network external to the premises.

6. The method of claim 1 wherein the incoming call is originated by an originator terminal comprising a wired terminal coupled to a wired network external to the premises.

7. The method of claim 1 wherein the switch comprises a private branch exchange (PBX).

8. The method of claim 1 wherein when the incoming call is directed to a designated remote access extension of the switch, access to one or more features of the switch is permitted only after an identifier of the incoming call has been determined to have a corresponding entry in the stored list.

9. The method of claim 8 wherein the switch is configured such that the one or more features of the switch are accessible by entry of one or more corresponding feature access codes at an originator terminal.

10. The method of claim 8 wherein the switch is configured such that in order to obtain access to the one or more features of the switch at least one designated security code must first be entered at an originator terminal.

11. A communication system switch for use in processing an incoming call received at an external port of the switch, the switch comprising: a memory; and
   a memory; and
   a processor coupled to the memory, the processor being operative to determine if an identifier associated with the incoming call has a corresponding entry in a stored list of external endpoints registered with the switch, the incoming call being a call initiated by entering at an originator terminal of the system a called number associated with a particular destination terminal supported by the switch, the identifier being extracted by the switch directly from the incoming call without requiring any further interaction between the switch and the originator terminal of the incoming call, and to process the incoming call such that the incoming call appears to the destination terminal as being originated by an internal extension associated with the switch if the identifier associated with the incoming call has a corresponding entry in the stored list of external endpoints registered with the switch;
   wherein the switch is configured such that upon determining that the identifier associated with the incoming call has a corresponding entry in the stored list of external endpoints, the incoming call is automatically processed such that the incoming call appears to the destination terminal as being originated by an internal extension associated with the switch, without requiring any further exchange of call setup information between the originator terminal and the switch.

12. The communication system switch of claim 11 wherein the incoming call is received at the external port of the switch from an originator terminal utilizable external to a premises serviced by the switch and not having an extension associated with any internal endpoint serviced by the switch.

13. The communication system switch of claim 11 wherein the processor is further operative to map the identifier associated with the incoming call to the corresponding entry in the stored list of external endpoints registered with the switch.

14. The communication system switch of claim 11 wherein the corresponding entry comprises the identifier associated with the incoming call and an internal extension assigned to an originator terminal and not associated with any internal endpoint serviced by the switch.

15. The communication system switch of claim 11 wherein the incoming call is originated by an originator terminal comprising a wireless terminal coupled to a wireless network external to the premises.

16. The communication system switch of claim 11 wherein the incoming call is originated by an originator terminal comprising a wired terminal coupled to a wired network external to the premises.

17. The communication system switch of claim 11 wherein the switch comprises a private branch exchange (PBX).

18. The communication system switch of claim 11 wherein the switch is configured such that when the incoming call is directed to a designated remote access extension of the switch, access to one or more features of the switch is permitted only after an identifier of the incoming call has been determined to have a corresponding entry in the stored list.

19. The communication system switch of claim 18 wherein the switch is configured such that the one or more features of the switch are accessible by entry of one or more corresponding feature access codes at an originator terminal.

20. The communication system switch of claim 18 wherein the switch is configured such that in order to obtain access to the one or more features of the switch at least one designated security code must first be entered at an originator terminal.

21. An article of manufacture comprising a machine-readable storage medium storing one or more programs for use in processing an incoming call received at an external port of a communication system switch, wherein the one or more programs when executed implement the steps of:

determining if an identifier associated with the incoming call has a corresponding entry in a stored list of external endpoints registered with the switch, the incoming call being a call initiated by entering at an originator terminal of the system a called number associated with a particular destination terminal supported by the switch, the identifier being extracted by the switch directly from the incoming call without requiring any further interaction between the switch and the originator terminal of the incoming call; and processing the incoming call such that the incoming call appears to the destination terminal as being originated by an internal extension associated with the switch if the identifier associated with the incoming call has a corresponding entry in the stored list of external endpoints registered with the switch;

wherein the switch is configured such that upon determining that the identifier associated with the incoming call has a corresponding entry in the stored list of external endpoints, the incoming call is automatically processed such that the incoming call appears to the destination terminal as being originated by an internal extension associated with the switch, without requiring any further exchange of call setup information between the originator terminal and the switch.

* * * * *